United States Patent
Feng et al.

(10) Patent No.: US 12,020,712 B2
(45) Date of Patent: Jun. 25, 2024

(54) AUDIO DATA RECOVERY METHOD, DEVICE AND BLUETOOTH DEVICE

(71) Applicant: Nanjing Zgmicro Company Limited, Jiangsu (CN)

(72) Inventors: Yuhong Feng, Nanjing (CN); Haiye Wang, Nanjing (CN); Xiaodong Yang, Nanking (CN); Yan Xiong, Nanjing (CN); Yinong Zhang, Nanjing (CN)

(73) Assignee: Nanjing Zgmicro Company Limited, Jiangsu (CN)

( * ) Notice: Subject to any disclaimer, the term of this patent is extended or adjusted under 35 U.S.C. 154(b) by 505 days.

(21) Appl. No.: 17/359,598

(22) Filed: Jun. 27, 2021

(65) Prior Publication Data
US 2021/0327441 A1    Oct. 21, 2021

Related U.S. Application Data

(63) Continuation of application No. PCT/CN2019/128776, filed on Dec. 26, 2019.

(51) Int. Cl.
*H04W 28/04*    (2009.01)
*G10L 19/00*    (2013.01)
*H04L 1/04*    (2006.01)
*H04W 4/80*    (2018.01)

(52) U.S. Cl.
CPC .......... *G10L 19/0017* (2013.01); *H04L 1/04* (2013.01); *H04W 4/80* (2018.02); *H04W 28/04* (2013.01)

(58) Field of Classification Search
CPC ........ G10L 19/0017; H04L 1/04; H04W 4/80; H04W 28/04
USPC .......................................... 370/216
See application file for complete search history.

(56) References Cited

U.S. PATENT DOCUMENTS

| | | | |
|---|---|---|---|
| 11,258,671 B1 * | 2/2022 | Vora | G10L 15/30 |
| 2019/0272837 A1 * | 9/2019 | Nemer | G10L 19/005 |
| 2023/0162747 A1 * | 5/2023 | Johnston | G10L 19/032 |

OTHER PUBLICATIONS

Ofir et al, Packet Loss Concealment for Audio Streaming based on the GAPES and MAPES Algorithms, 2006, IEEE, 280-283. (Year: 2006).*

* cited by examiner

*Primary Examiner* — Christopher R Crompton
(74) *Attorney, Agent, or Firm* — Joe Zheng

(57) ABSTRACT

An audio data recovery method, an audio data recovery device and a Bluetooth device are described. The audio data recovery method comprises: dividing audio data into a first frequency domain component and a second frequency domain component in a frequency domain; using a second data recovery algorithm to recover the audio data in the second frequency domain component; and using a first data recovery algorithm with lower complexity than the second data recovery algorithm to recover the audio data in the first frequency domain component.

16 Claims, 3 Drawing Sheets

AUDIO DATA RECOVERY METHOD, DEVICE AND BLUETOOTH DEVICE

CROSS-REFERENCES TO RELATED APPLICATIONS

This patent application is a continuation of PCT/CN2019/128776 filed on Dec. 26, 2019, which claims the priority of Chinese Patent Application No.: 201811621631.X, filed on Dec. 28, 2018 in China, and the entire content of which is incorporated herein by reference.

BACKGROUND OF THE INVENTION

Field of the Invention

The present disclosure relates to the field of Bluetooth technology, and in particular to an audio data recovery method, an audio data recovery device, and a Bluetooth device.

Description of the Related Art

The transmission bandwidth is limited in Bluetooth channel. A transmitter (a.k.a., master) of Bluetooth audio transmission needs to compress audio signal before transmission, and then sends the compressed audio signal to a receiver (a.k.a., slave) through wireless transmission. When a distance between the master device and the salve device is beyond a certain distance, or even the distance between the master device and the salve device is close, there is interference, packet loss or packet error may occur in the wireless transmission. As a result, the audio signal received by the slave device appears jam and noisy during decoding and playback.

There are at least two common approaches to solve the audio data error caused by packet loss or packet error. One is to add redundant information, such as CRC check, error correction code, and other important coding information protection mechanisms, to the code stream when the master device is transmitting. The other is to use correlation of the audio signal itself, and use good data packets before and after the lost or error data packet to recover the lost or error data packet on the slave device. A simplest method is to insert a silent frame data or repeat a previous good frame data. A more complex method is a model-based interpolation. For example, an interpolation based on autoregressive AR model or sine model is used to recover the audio data. However, these two methods have poor recovery quality, especially in the case of higher packet loss rates. Therefore, there is a need for an improved technical solution to the above-mentioned problems.

SUMMARY OF THE INVENTION

An audio data recovery method, an audio data recovery device and a Bluetooth device are provided according to embodiments of the present invention to solve the above technical problems.

According to one aspect of the present invention, an audio data recovery method comprises: dividing audio data into a first frequency domain component and a second frequency domain component in a frequency domain; using a second data recovery algorithm to recover the audio data in the second frequency domain component; and using a first data recovery algorithm with lower complexity than the second data recovery algorithm to recover the audio data in the first frequency domain component.

According to another aspect of the present invention, an audio data recovery device is provided and comprises: a classification module configured for dividing audio data into a first frequency domain component and a second frequency domain component in a frequency domain; a first recovery module configured for using a second data recovery algorithm to recover the audio data in the second frequency domain component; and a second recovery module configured for using a first data recovery algorithm with lower complexity than the second data recovery algorithm to recover the audio data in the first frequency domain component.

According to another aspect of the present invention, a Bluetooth device is provided and comprises: an audio data recovery device. The audio data recovery device comprises: a classification module configured for dividing audio data into a first frequency domain component and a second frequency domain component in a frequency domain; a first recovery module configured for using a second data recovery algorithm to recover the audio data in the second frequency domain component; and a second recovery module configured for using a first data recovery algorithm with lower complexity than the second data recovery algorithm to recover the audio data in the first frequency domain component.

One of the advantages, features or advantages of the present invention is that the audio data is divided into a first frequency domain component and a second frequency domain component in a frequency domain, a second data recovery algorithm is used to recover the audio data in the second frequency domain component; and a first data recovery algorithm with lower complexity than the second data recovery algorithm is used to recover the audio data in the first frequency domain component, so that computational complexity of audio data recovery is reduced, and high-quality audio recovery can be achieved on the Bluetooth devices without sufficient computational resources.

There are many other objects, together with the foregoing attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings wherein:

DETAILED DESCRIPTION OF THE PREFERRED EMBODIMENTS

The detailed description of the invention is presented largely in terms of procedures, operations, logic blocks, processing, and other symbolic representations that directly or indirectly resemble the operations of data processing devices that may or may not be coupled to networks. These process descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be comprised in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Gapped-data Amplitude and Phase Estimation (GAPES) algorithm is well known and commonly used to recover audio data in the prior art. Compared with other commonly used approaches, various methods based on the GAPES algorithm have significantly improved quality of the recovered audio data, and demonstrate good effects even at a 30% packet loss rate. However, the computational complexity involving with the GAPES algorithm is of high, and not practical for some Bluetooth audio devices without sufficient computational resources.

The detailed introduction of the GAPES algorithm can be found in the paper "Packet Loss Concealment for Audio Streaming Based on the GAPES Algorithm" published by Hadas Ofir and David Malah in 2005, which is hereby incorporated by reference. One of the objectives, advantages and benefits in the present invention is of low-complexity based on the GAPES algorithm. Various embodiments of the present inventions have proven practical for Bluetooth audio devices without sufficient computational resources, to improve the quality of the recovered audio data.

Figure 1:
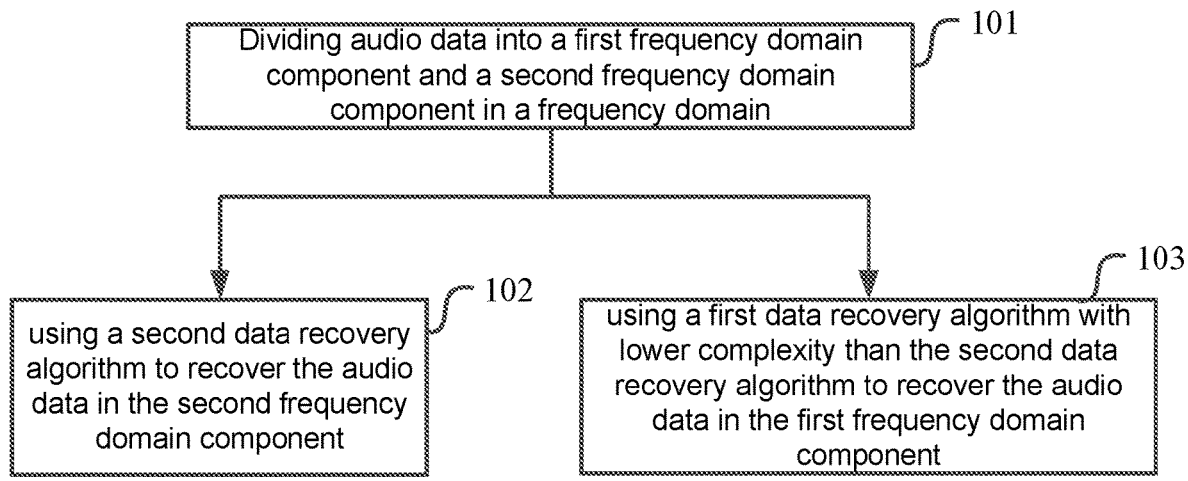
FIG. 1 is a schematic flow chart showing an audio data recovery method according to one embodiment of the present invention.

FIG. 1 is a schematic flowchart showing an audio data recovery method according to one embodiment of the present invention. As shown in FIG. 1, the audio data recovery method comprises: dividing audio data into a first frequency domain component and a second frequency domain component in a frequency domain at 101; using a second data recovery algorithm to recover the audio data in the second frequency domain component at 102; and using a first data recovery algorithm with lower complexity than the second data recovery algorithm to recover the audio data in the first frequency domain component at 103.

After the audio data is received, an audio data receiver can perform a time-frequency transform on the audio data to transform a time domain signal into a frequency domain signal, then divide the audio data into two types of frequency domain components (namely, the first frequency component and the second frequency-domain component) in the frequency domain, and use different audio data recovery algorithms for the two types of frequency domain components to recover the audio data.

The audio data is divided into two types of frequency domain components. One type is the first frequency component, and the other type is the second frequency-domain component. The second data recovery algorithm is used to recover the audio data in the second frequency domain component. The first data recovery algorithm with lower complexity than the second data recovery algorithm is used to recover the audio data in the first frequency domain component. In this way, only a few of frequency domain components need to be estimated by the second data recovery algorithm, which can greatly reduce the computational complexity, and it can achieve high-quality audio recovery even on the Bluetooth devices without sufficient computational resources.

In one embodiment, the first frequency domain component is a noise-like component, and the second frequency domain component is a tone-dominant component. A power of the tone-dominant component is higher than a power of the noise-like component. The second data recovery algorithm is a Gapped-data Amplitude and Phase Estimation algorithm. The first data recovery algorithm is a noise shaping and random phase algorithm.

In one embodiment, it is assumed a time-frequency transform (e.g., Fourier Transform or FFT) has been applied to the audio data that is now in frequency domain. The (transformed) audio data is divided into a first frequency domain component and a second frequency domain component in a frequency domain at 101. In one embodiment, the audio data is divided into a first type of frame data and a second type of frame data in the frequency domain; and dividing the first type of frame data into the first frequency domain component and the second frequency domain component.

The first type of frame data may be incorrect audio data, which is usually caused by packet loss or error packet. It can also be called as problem frame, incorrect frame, or bad frame, etc. The second type of frame data may be correct audio data, or be called as good frame, good audio data or good packet, etc. After the audio data is divided into the correct audio data and the incorrect audio data, only the incorrect audio data can be divided into the frequency domain components, and then the divided frequency domain components can be recovered separately.

In one embodiment, whether the current frame audio data is the first type of frame data or the second type of frame data is determined according to a check mechanism or an error frame flag of the audio data, which will not be further described herein to avoid obscuring aspects of the present invention. Those skilled in the art know there are various methods to indicate whether a frame of audio data is perfect or includes errors.

In one embodiment, dividing the first type of frame data into the first frequency domain component and the second frequency domain component comprises: estimating a power spectrum of the first type of frame data; determining peaks of the power spectrum; determining candidate frequency domain components according to the peaks; and regarding the candidate frequency domain components whose power is greater than a preset or predefined threshold as the second frequency domain component, and other candidate frequency domain components as the first frequency domain component.

In one embodiment, a local maximum method can be used to find the peaks of the estimated power spectrum. In one embodiment, estimating a power spectrum of the first type of frame data comprises: calculating the power spectrum of the first type of frame data according to following formula:

$$P_m(k) = |X_{m_1}(k)|^2 + |X_{m_2}(k)|^2,$$

where m is a sequence number of the current first type of frame, $m_1$ is a sequence number of the previous second type of frame adjacent to the current first type of frame, $m_2$ is a sequence number of the next second type of frame data adjacent to the current first type of frame, $|X_{m_1}(k)|$ is spectrum data of a $m_1$th frame, and $|X_{m_2}(k)|$ is spectrum data of a $m_2$th frame. Specifically, suppose that $X_m(k)$ is the spectrum data of FFT bins of the mth frame, k is the number of the FFT bin, 1≤k≤L and L is the length of the FFT transform.

The spectrum data of the previous second of type of frame adjacent to the current frame (the first type of frame) and the spectrum data of the next second type of frame adjacent to the current frame can be used to estimate the power spectrum of the current frame.

In one embodiment, the determining candidate frequency domain components according to the peaks comprises: sorting the peaks from large to small; and determining the frequency domain components with the first N peaks after sorting as centers and within a preset length as the candidate frequency domain components. N can be a positive integer, for example, N can be 10. For each peak PeakBin picked out, a window with the peak PeakBin as a center can be added, and the FFT bin within the window can be regarded as one candidate frequency domain component WinBin of the tone bin (tone-dominant component). The length of this window can be set to a value equal to 3 or 5.

In one embodiment, the using a first data recovery algorithm with lower complexity than the second data recovery algorithm to recover the audio data in the first frequency domain component comprises: recovering the audio data in the first frequency domain component according to following formula:

$$\hat{X}_m(k) = s(k)\alpha(k)X_{m-1}(k),\qquad \text{i.}$$

wherein, $s(k)$ is a random variable, a value of $s(k)$ is $\{1, -1\}$; $\alpha(k)$ is an amplitude shaping factor; m is a sequence number of the current frame (the first type of frame); m−1 is a sequence number of the previous frame adjacent to the current frame; $|X_{m-1}(k)|$ is spectrum data of a m−1 th frame.

The current frame is recovered by using the random variable $s(k)$ to add a random phase to the spectrum data of the previous frame and combining with the amplitude shaping factor $\alpha(k)$ to the spectrum data of the previous frame.

In one embodiment, the amplitude shaping factor can be a preset constant. For example, the amplitude shaping factor is 0.9. In another embodiment, the amplitude shaping factor is calculated according to following formula:

$$\alpha^2(k) = \frac{\sum_{k \in B_b} |X_{m_1}(k)|^2}{\sum_{k \in B_b} |X_{m_2}(k)|^2}$$

wherein, $B_b$ is a critical subband of the spectrum; $m_1$ is a sequence number of the previous second type of frame adjacent to the current frame, $m_2$ is a sequence number of the next second type of frame data adjacent to the current frame, $|X_{m_1}(k)|$ is spectrum data of a $m_1$th frame, and $|X_{m_2}(k)|$ is spectrum data of a $m_2$th frame.

In one embodiment, the entire spectrum can be divided into a plurality of subbands (bin). One corresponding amplitude shaping factor can be calculated for each subband.

Based on the same inventive concept, an audio data recovery device is also provided according to one embodiment of the present invention. Since the audio data recovery device solves the same problem with similar principle with the audio data recovery method provided in the first embodiment of the present invention, the implementation of the audio data recovery device can refer to the implementation of the method, and the repetition will not be repeated.

Figure 2:
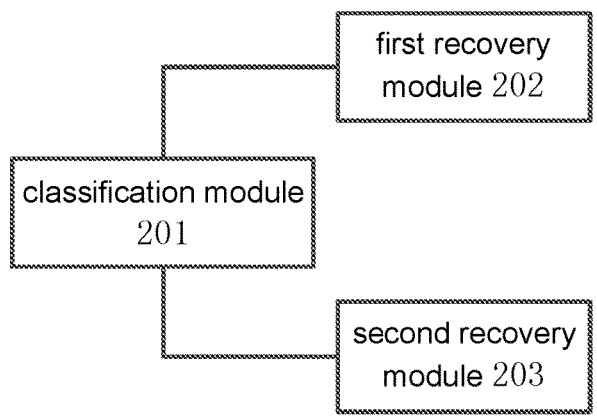
FIG. 2 is a schematic structural diagram showing an audio data recovery device according to one embodiment of the present invention.

FIG. 2 is a schematic structural diagram of an audio data recovery device according to one embodiment of the present invention. As shown in FIG. 2, the audio data recovery device includes: a classification module 201 configured for dividing audio data into a first frequency domain component and a second frequency domain component in a frequency domain; a first recovery module 202 configured for using a second data recovery algorithm to recover the audio data in the second frequency domain component; and a second recovery module 203 configured for using a first data recovery algorithm with lower complexity than the second data recovery algorithm to recover the audio data in the first frequency domain component.

In the audio data recovery device of the present invention, the audio data is divided into two types of frequency domain components. One type is the first frequency component, and the other type is the second frequency-domain component. The second data recovery algorithm is used to recover the audio data in the second frequency domain component. The first data recovery algorithm with lower complexity than the second data recovery algorithm is used to recover the audio data in the first frequency domain component. In this way, only a few of frequency domain components need to be estimated by the second data recovery algorithm, which can greatly reduce the computational complexity, and it can achieve high-quality audio recovery even on the Bluetooth devices without sufficient computational resources.

In one embodiment, the classification module comprises: a first classification unit configured for dividing the audio data into a first type of frame data and a second type of frame data in the frequency domain; and a second classification unit configured for dividing the first type of frame data the first frequency domain component and the second frequency domain component.

In one embodiment, the first type of frame data is incorrect data, and the second type of frame data is correct data. In one embodiment, the second classification unit comprises: an estimation subunit configured for estimating a power spectrum of the first type of frame data; a peak value determination subunit configured for determining peaks of the power spectrum; a candidate frequency domain component determining subunit configured for determining candidate frequency domain components according to the peaks; and a classification subunit configured for regarding the candidate frequency domain components whose power is greater than a preset threshold as the second frequency domain component, and other candidate frequency domain components as the first frequency domain component.

In one embodiment, the estimation subunit is configured for calculating the power spectrum of the first type of frame data according to following formula:

$$P_m(k) = |X_{m_1}(k)|^2 + |X_{m_2}(k)|^2,$$

where m is a sequence number of the current first type of frame, $m_1$ is a sequence number of the previous second type of frame adjacent to the current first type of frame (current frame), $m_2$ is a sequence number of the next second type of frame data adjacent to the current first type of frame, $|X_{m_1}(k)|$ is spectrum data of a $m_1$th frame, and $|X_{m_2}(k)|$ is spectrum data of a $m_2$th frame.

In one embodiment, a local maximum method can be used to find the peaks of the estimated power spectrum. In one embodiment, the candidate frequency domain component determining subunit is configured for: sorting the peaks from large to small; and determining the frequency domain components with the first n peaks after sorting as centers and within a preset length as the candidate frequency domain components.

In one embodiment, the second recovery module is configured for: recovering the audio data in the first frequency domain component according to following formula:

$$\hat{X}_m(k)=s(k)\alpha(k)X_{m-1}(k),\quad\quad\text{ii.}$$

wherein, s(k) is a random variable, a value of s(k) is {1, −1}; α(k) is an amplitude shaping factor; m is a sequence number of the current first type of frame; m−1 is a sequence number of the previous frame adjacent to the current first type of frame; $|X_{m-1}(k)|$ is spectrum data of a m−1th frame In one embodiment, the amplitude shaping factor can be a preset constant. In another embodiment, the amplitude shaping factor is calculated according to following formula:

$$\alpha^2(k) = \frac{\sum_{k\in B_b}|X_{m_1}(k)|^2}{\sum_{k\in B_b}|X_{m_2}(k)|^2}$$

wherein, $B_b$ is a critical subband of the spectrum; $m_1$ is a sequence number of the previous second type of frame adjacent to the current frame, $m_2$ is a sequence number of the next second type of frame data adjacent to the current frame, $|X_{m_1}(k)|$ is spectrum data of a $m_1$th frame, and $|X_{m_2}(k)|$ is spectrum data of a $m_2$th frame.

Based on the same inventive concept, a Bluetooth device is provided according to one embodiment of the present invention. Since the Bluetooth device solves the same problem with similar principle with the method provided in the first embodiment of the present invention, the implementation of the Bluetooth device can refer to the method can refer to the implementation of the method, and the repetition will not be repeated.

Figure 3:
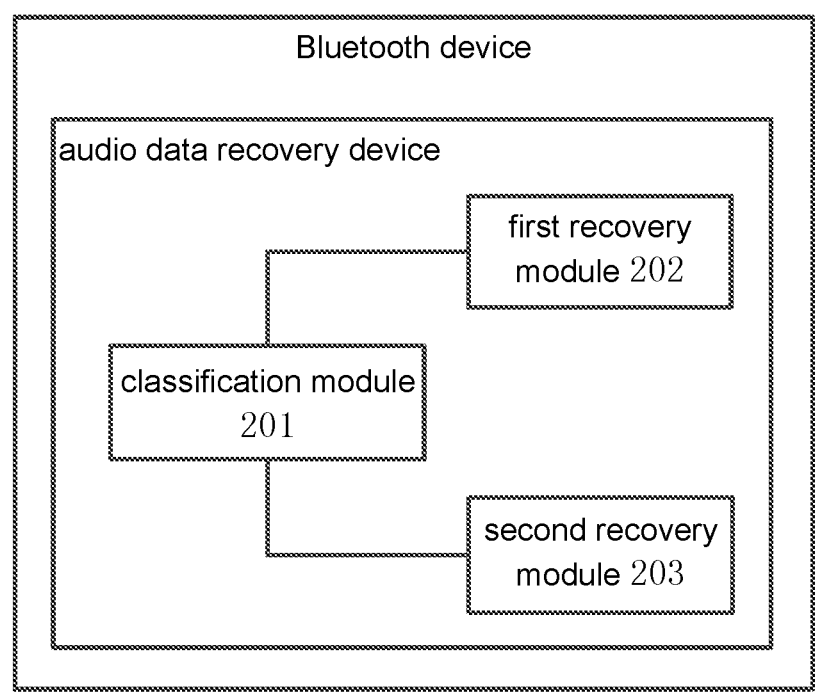
FIG. 3 is a schematic structural diagram showing a Bluetooth device according to one embodiment of the present invention.

FIG. 3 is a schematic structural diagram of a Bluetooth device according to one embodiment of the present invention. As shown in FIG. 3, the Bluetooth device includes: an audio data recovery device shown in FIG. 2.

The Bluetooth device may be a Bluetooth headset, a Bluetooth speaker, a Bluetooth gateway, a Bluetooth MP3, a Bluetooth flash disk, a Bluetooth vehicle-mounted device, a Bluetooth adapter, etc., which are not limited in the present disclosure.

In the Bluetooth device of the present invention, the audio data is divided into two types of frequency domain components. One type is the first frequency component, and the other type is the second frequency-domain component. The second data recovery algorithm is used to recover the audio data in the second frequency domain component. The first data recovery algorithm with lower complexity than the second data recovery algorithm is used to recover the audio data in the first frequency domain component. In this way, only a few of frequency domain components need to be estimated by the second data recovery algorithm, which can greatly reduce the computational complexity, and it can achieve high-quality audio recovery even on the Bluetooth devices without sufficient computational resources.

Figure 4:
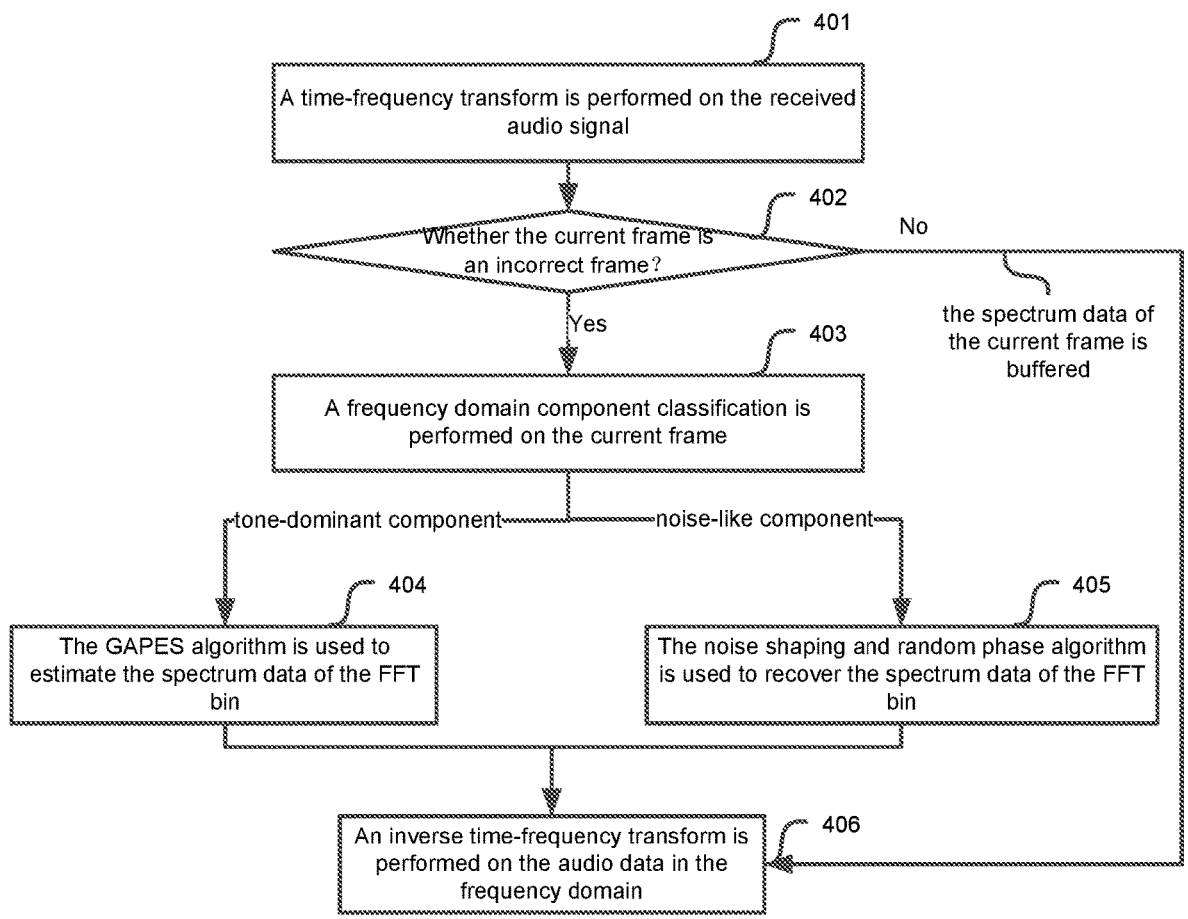
FIG. 4 is a schematic flow chart showing a Bluetooth audio process according to one embodiment of the present invention.

FIG. 4 shows a schematic diagram showing a Bluetooth audio process according to one embodiment of the present invention. As shown in FIG. 4, the Bluetooth audio process comprises following operations.

A time-frequency transform is performed on the received audio signal at 401. Usually, Fast Fourier transform (FFT) is used to perform the time-frequency transform. Before the FFT transform, an analysis window can be added to the time-domain audio signal, and then the FFT transform is performed. Since the FFT technology is a common technology in an existing digital signal processing, it will not be repeated here.

The audio data comprises a plurality of frames and is processed in frame. Whether the current frame is an incorrect frame is determined at 402. In one embodiment, data frames in the present invention are divided into correct frames and incorrect frames (for example, lost or error frames, etc.).

If the current frame is a good frame, the spectrum data of the current frame is buffered, and the process flow goes to 406. If the current frame is a bad frame, the process flow goes to 403. A frequency domain component classification is performed on the current frame at 403.

The power spectrum of the current frame is estimated according to the frequency spectrum of the buffered good frame data. Each FFT bin is classified by a peak detection method based on the estimated power spectrum of the current frame.

If the FFT bin of the current incorrect frame is classified as the tone-dominant component, the process flow goes to 404. If the FFT bin of the current bad frame is classified as the noise-like component, the process flow goes to 405.

The GAPES algorithm is used to estimate the spectrum data of the FFT bin at 404. The noise shaping and random phase algorithm is used to recover the spectrum data of the FFT bin at 405.

An inverse time-frequency transform is performed on the audio data in the frequency domain at 406. Inverse fast Fourier transform IFFT is used to perform the inverse time-frequency transform. A synthesis window is added to the audio signal after the IFFT transform, and then overlap-add processing (overlap-add) is performed to obtain the reconstructed time domain audio signal.

The following experiment is used to prove beneficial effects of the present invention.

Under normal circumstances, a 24-bit fixed-point digital signal processor (DSP) is used, and it need 12 MHz to estimate one FFT bin by using the GAPES algorithm. Assuming 1024-point FFT is used, 513 FFT bins need to be estimated in order to recover the current frame data.

If all the FFT bins are estimated by the GAPES algorithm, 12*513=6156 MHz is required. If the method provided in the present invention is used, only a few of FFT bins are required to use the GAPES algorithm, and the other bins are recovered according to the noise shaping and random phase algorithm. It can be determined through the experiment that the audio quality obtained by estimating only 30 FFT bins based on the GAPES algorithm in the present invention is basically the same as the audio quality obtained by estimating all the 513 FFT bins based on the GAPES algorithm in the related art at a packet error rate of 10%.

According to one aspect of the present invention, the present invention can be implemented as a nonvolatile computer-readable medium. The nonvolatile computer-readable medium comprises instructions executed by a processor. The instructions cause the processor to perform: capturing ambient sound; detecting the ambient sound, and triggering the headphone to enter an interactive mode when a preset interested sound appears in the ambient sound; controlling the headphone to output an interactive reminder in the interactive mode. The interactive reminder comprises one type or a combination of multiple types of a visual reminder, a tactile reminder and an auditory reminder.

Those skilled in the art should be aware that the embodiments of this application may be methods, systems, or computer program products. Accordingly, the present invention may take the form of a complete hardware embodiment, a complete software embodiment, or an embodiment in conjunction with software and hardware aspects. Furthermore, the present invention may take the form of a computer program product implemented on one or more computer-available storage media (including, but not limited to, disk memory, CD-ROM, optical memory, etc.) containing computer-available program code.

The present invention is described with reference to methods, equipment (systems), and flow charts and/or block diagrams of computer program products according to the embodiment of the present invention. It should be understood that each flow and/or block in a flowchart and/or block diagram, as well as the combination of flow and/or block in a flowchart and/or block diagram, can be implemented by computer program instructions. These computer program instructions may be provided to a processor of a general purpose computer, a dedicated computer, an embedded processor, or other programmable data processing device to produce a machine such that instructions executed by a processor of a computer or other programmable data processing device produce instructions for implementing a flow chart or more. A device for processes and/or block diagrams or functions specified in a box or multiple boxes.

These computer program instructions may also be stored in a computer-readable memory that may guide a computer or other programmable data processing device to work in a particular way, such that the instructions stored in the computer-readable memory generate a manufacturer including an instruction device that is implemented in a flow chart one or more processes. Process and/or block diagram, a box or function specified in multiple boxes.

These computer program instructions may also be loaded on a computer or other programmable data processing device such that a series of operational steps are performed on a computer or other programmable device to produce computer-implemented processing, thereby providing instructions executed on a computer or other programmable device for implementing a flow chart. The steps of a process or multiple processes and/or block diagrams, or functions specified in a box.

Although preferred embodiments of the present invention have been described, additional changes and modifications to these embodiments may be made once the basic creative concepts are known to those skilled in the art. The appended claims are therefore intended to be interpreted to include preferred embodiments and all changes and modifications falling within the scope of this application.

Obviously, a person skilled in the art may make various changes and variations to the application without departing from the spirit and scope of the application. Thus, if these modifications and variations of this application fall within the scope of the claims and their equivalent technologies, the application is also intended to include these changes and variations.

We claim:

1. An audio data recovery method, comprising:
dividing audio data into a first frequency domain component and a second frequency domain component in a frequency domain, wherein said dividing audio data into a first frequency domain component and a second frequency domain component in a frequency domain comprises:
dividing the audio data into a first type of frame data and a second type of frame data in the frequency domain; and
dividing the first type of frame data into the first frequency domain component and the second frequency domain component, wherein said dividing the first type of frame data into the first frequency domain component and the second frequency domain component further comprises:
estimating a power spectrum of the first type of frame data;
determining peaks of the power spectrum;
determining candidate frequency domain components according to the peaks; and
regarding the candidate frequency domain components whose power is greater than a preset threshold as the second frequency domain component, and other candidate frequency domain components as the first frequency domain component;
using a second data recovery algorithm to recover the audio data in the second frequency domain component; and
using a first data recovery algorithm with less complexity than the second data recovery algorithm to recover the audio data in the first frequency domain component.

2. The audio data recovery method according to claim 1, wherein the first frequency domain component is a noise-like component, the second frequency domain component is a tone-dominant component, and a power of the tone-dominant component is higher than a power of the noise-like component.

3. The audio data recovery method according to claim 1, wherein the second data recovery algorithm is a Gapped-data Amplitude and Phase Estimation algorithm.

4. The audio data recovery method according to claim 1, wherein the first data recovery algorithm is a noise shaping and random phase algorithm.

5. The audio data recovery method according to claim 1, wherein the first type of frame data is incorrect data, and the second type of frame data is correct data.

6. The audio data recovery method according to claim 1, wherein the estimating a power spectrum of the first type of frame data comprises:
calculating the power spectrum of the first type of frame data according to following formula:

$$P_m(k)=|X_{m_1}(k)|^2+|X_{m_2}(k)|^2,$$

where m is a sequence number of the current first type of frame, $m^1$ is a sequence number of the previous second type of frame adjacent to the current first type of frame, $m_2$ is a sequence number of the next second type of frame data adjacent to the current first type of frame, $|X_{m_1}(k)|$ is spectrum data of a meth frame, and $|X_{m2}(k)|$ is spectrum data of a meth frame.

7. The audio data recovery method according to claim 1, wherein the determining candidate frequency domain components according to the peaks comprises:
sorting the peaks from large to small; and
determining the frequency domain components with the first N peaks after sorting as centers and within a preset length as the candidate frequency domain components.

8. The audio data recovery method according to claim 1, wherein the using a first data recovery algorithm with lower complexity than the second data recovery algorithm to recover the audio data in the first frequency domain component comprises:

recovering the audio data in the first frequency domain component according to following formula:

$$\hat{X}_m(k) = s(k)\alpha(k)X_{m-1}(k),$$

wherein, s(k) is a random variable, a value of s(k) is {1, −1}; $\alpha(k)$ is an amplitude shaping factor; m is a sequence number of the current first type of frame; m-1 is a sequence number of the previous frame adjacent to the current first type of frame; $|X_{m-1}(k)|$ is spectrum data of a m-1th frame.

9. The audio data recovery method according to claim 8, wherein the amplitude shaping factor is calculated according to following formula:

$$\alpha^2(k) = \frac{\sum_{k \in B_b} |X_{m_1}(k)|^2}{\sum_{k \in B_b} |X_{m_2}(k)|^2}$$

wherein, $B_b$ is a critical subband of the spectrum; mi is a sequence number of the previous second type of frame adjacent to the current first type of frame, $m_2$ is a sequence number of the next second type of frame data adjacent to the current first type of frame, $|X_{m_1}(k)|$ is spectrum data of a $m_1$th frame, and $|X_{m_2}(k)|$ is spectrum data of a $m_2$th frame.

10. An audio data recovery device, comprising:
a classification module configured for dividing audio data into a first frequency domain component and a second frequency domain component in a frequency domain, wherein the classification module comprises:
a first classification unit configured for dividing the audio data into a first type of frame data and a second type of frame data in the frequency domain; and
a second classification unit configured for dividing the first type of frame data into the first frequency domain component and the second frequency domain component, wherein the second classification unit further comprises:
an estimation subunit configured for estimating a power spectrum of the first type of frame data;
a peak value determination subunit configured for determining peaks of the power spectrum;
a candidate frequency domain component determining subunit configured for determining candidate frequency domain components according to the peaks; and
a classification subunit configured for regarding the candidate frequency domain components whose power is greater than a preset threshold as the second frequency domain component, and other candidate frequency domain components as the first frequency domain component;
a first recovery module configured for using a second data recovery algorithm to recover the audio data in the second frequency domain component; and
a second recovery module configured for using a first data recovery algorithm with lower complexity than the second data recovery algorithm to recover the audio data in the first frequency domain component.

11. The audio data recovery device according to claim 10, wherein the first frequency domain component is a noise-like component, the second frequency domain component is a tone-dominant component, and a power of the tone-dominant component is higher than a power of the noise-like component; and
wherein the second data recovery algorithm is a Gapped-data Amplitude and Phase Estimation algorithm, and the first data recovery algorithm is a noise shaping and random phase algorithm.

12. The audio data recovery device according to claim 10 wherein the first type of frame data is incorrect data, and the second type of frame data is correct data.

13. The audio data recovery device according to claim 10, wherein the estimation subunit is configured for calculating the power spectrum of the first type of frame data according to following formula:

$$P_m(k) = |X_{m_1}(k)|^2 + |X_{m_2}(k)|^2,$$

where m is a sequence number of the current first type of frame, $m_1$ is a sequence number of the previous second type of frame adjacent to the current first type of frame, $m_2$ is a sequence number of the next second type of frame data adjacent to the current first type of frame, $|X_{m_1}(k)|$ is spectrum data of a $m_1$th frame, and $|X_{m_2}(k)|$ is spectrum data of a $m_2$th frame.

14. The audio data recovery device according to claim 10, wherein the candidate frequency domain component determining subunit is configured for:
sorting the peaks from large to small; and
determining the frequency domain components with the first N peaks after sorting as centers and within a preset length as the candidate frequency domain components.

15. The audio data recovery device according to claim 10, wherein the second recovery module is configured for:
recovering the audio data in the first frequency domain component according to following formula:

$$\hat{X}_m(k) = s(k)\alpha(k)X_{m-1}(k),$$

wherein, s(k) is a random variable, a value of s(k) is {1, −1}; $\alpha(k)$ is an amplitude shaping factor; m is a sequence number of the current first type of frame; m-1 is a sequence number of the previous frame adjacent to the current first type of frame; $|X_{m-1}(k)|$ is spectrum data of a m-1th frame.

16. The audio data recovery device according to claim 15, wherein the amplitude shaping factor is calculated according to following formula:

$$\alpha^2(k) = \frac{\sum_{k \in B_b} |X_{m_1}(k)|^2}{\sum_{k \in B_b} |X_{m_2}(k)|^2}$$

wherein, $B_b$ is a critical subband of the spectrum; mi is a sequence number of the previous second type of frame adjacent to the current first type of frame, $m_2$ is a sequence number of the next second type of frame data adjacent to the current first type of frame, $|X_{m_1}(k)|$ is spectrum data of a $m_1$th frame, and $|X_{m_2}(k)|$ is spectrum data of a $m_2$th frame.

* * * * *